(12) United States Patent
Takeda et al.

(10) Patent No.: US 11,229,020 B2
(45) Date of Patent: Jan. 18, 2022

(54) USER TERMINAL AND RADIO COMMUNICATION METHOD

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Huiling Li, Beijing (CN); Xiaolin Hou, Beijing (CN); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/762,039

(22) PCT Filed: Nov. 10, 2017

(86) PCT No.: PCT/JP2017/040642
§ 371 (c)(1),
(2) Date: May 6, 2020

(87) PCT Pub. No.: WO2019/092857
PCT Pub. Date: May 16, 2019

(65) Prior Publication Data
US 2020/0344727 A1    Oct. 29, 2020

(51) Int. Cl.
*H04W 72/04* (2009.01)
*H04W 24/10* (2009.01)

(52) U.S. Cl.
CPC ......... *H04W 72/042* (2013.01); *H04W 24/10* (2013.01)

(58) Field of Classification Search
CPC ............................ H04W 72/042; H04W 24/10
See application file for complete search history.

(56) References Cited

U.S. PATENT DOCUMENTS

2011/0249578 A1    10/2011  Nayeb Nazar et al.
2013/0142134 A1    6/2013   Zhu et al.
(Continued)

FOREIGN PATENT DOCUMENTS

EP    2547139 A1    1/2013
EP    3700254 A1    8/2020
(Continued)

OTHER PUBLICATIONS

International Search Report issued in PCT/JP2017/040642 dated Jan. 23, 2018 (1 page).
(Continued)

*Primary Examiner* — Ronald B Abelson
(74) *Attorney, Agent, or Firm* — Osha Bergman Watanabe & Burton LLP

(57) ABSTRACT

To appropriately control CSI reporting in a case where a configuration different from the configurations in the existing LTE systems is employed for communication, a user terminal includes a receiving section that receives information indicating whether to activate or deactivate channel state information reporting, in at least one of first downlink control information indicating UL transmission specifically to the user terminal, second downlink control information indicating the UL transmission to a plurality of user terminals, and MAC control information, and a control section that controls reporting of channel state information, based on the information indicating whether to activate or deactivate the channel state information reporting.

7 Claims, 11 Drawing Sheets

DCI CONTENTS

| HEADER |
|---|
| CARRIER IDENTIFIER |
| PUSCH RESOURCE (FREQUENCY DOMAIN) |
| PUSCH RESOURCE (TIME DOMAIN) |
| VRB-to-VRB MAPPING |
| UCI on PUSCH INFORMATION |
| MODULATION AND CODING SCHEME |
| NEW DATA REPORTING |
| REDUNDANCY VERSION |
| HARQ PROCESS NUMBER |
| TPC COMMAND (FOR PUSCH) |
| DMRS CONFIGURATION |
| CSI REQUEST |
| PADDING BIT |

(56) References Cited

U.S. PATENT DOCUMENTS

2015/0029910 A1\* 1/2015 He .............................. H04L 5/14
2016/0323901 A1\* 11/2016 Yum ................... H04W 72/085
2020/0336227 A1 10/2020 Takeda et al.

FOREIGN PATENT DOCUMENTS

WO         2011/085230 A2      7/2011
WO         2017/169008 A1     10/2017
WO PCT/EP2017/081249       * 12/2017

OTHER PUBLICATIONS

Written Opinion of the International Searching Authority issued in PCT/JP2017/040642 dated Jan. 23, 2018 (4 pages).
Huawei, HiSilicon; "Independent and joint control of CSI-RS transmission and CSI reporting for NR MIMO"; 3GPP TSG RAN WG1 #88 Meeting, R1-1701681; Athens, Greece; Feb. 13-17, 2017 (7 pages).
3GPP TS 36.300 V8.12.0; "3rd Generation Partnership Project; Technical Specification Group Radio Access Network Evolved Universal Terrestrial Radio Access (E-UTRA) and Evolved Universal Terrestrial Radio Access Network (E-UTRAN); Overall description; Stage 2 (Release 8)"; Mar. 2010 (149 pages).
Extended European Search Report issued in counterpart European Patent Application No. 17931221.0, dated May 21, 2021 (10 pages).

\* cited by examiner

| DCI CONTENTS |
|---|
| HEADER |
| CARRIER IDENTIFIER |
| PUSCH RESOURCE (FREQUENCY DOMAIN) |
| PUSCH RESOURCE (TIME DOMAIN) |
| VRB-to-VRB MAPPING |
| UCI on PUSCH INFORMATION |
| MODULATION AND CODING SCHEME |
| NEW DATA REPORTING |
| REDUNDANCY VERSION |
| HARQ PROCESS NUMBER |
| TPC COMMAND (FOR PUSCH) |
| DMRS CONFIGURATION |
| CSI REQUEST |
| PADDING BIT |

| DCI CONTENTS |
|---|
| HEADER |
| CARRIER IDENTIFIER |
| PUSCH RESOURCE (FREQUENCY DOMAIN) |
| PUSCH RESOURCE (TIME DOMAIN) |
| VRB-to-VRB MAPPING |
| UCI on PUSCH INFORMATION |
| MODULATION AND CODING SCHEME |
| NEW DATA REPORTING |
| REDUNDANCY VERSION |
| HARQ PROCESS NUMBER |
| TPC COMMAND (FOR PUSCH) |
| DMRS CONFIGURATION |
| CSI REQUEST |
| PADDING BIT |

USER TERMINAL AND RADIO COMMUNICATION METHOD

TECHNICAL FIELD

The present invention relates to a user terminal and a radio communication method in next-generation mobile communication systems.

BACKGROUND ART

In the Universal Mobile Telecommunications System (UMTS) network, the specifications of Long Term Evolution (LTE) have been drafted for the purpose of further increasing high speed data rates, providing lower latency and so on (see Non-Patent Literature 1). Additionally, for the purpose of further increasing bandwidth and speed with respect to LTE (also referred to as LTE Rel. 8 or Rel. 9), LTE-A (also referred to as LTE Advanced, LTE Rel. 10, Rel. 11, or Rel. 12) has been specified, and successor systems of LTE (referred to as, for example, "Future Radio Access (FRA)," "5th generation mobile communication system (5G)," "5G+ (plus)," "New Radio (NR)," "New radio access (NX)," "Future generation radio access (FX)," "LTE Rel. 13," "LTE Rel. 14," "LTE Rel. 15" (or later versions), and so on) have also been under study.

In existing LTE systems (for example, LTE Rel. 8 to Rel. 13), a UE maps an uplink signal to appropriate radio resources and transmits the radio resources to an eNB. Uplink user data is transmitted by using an uplink shared channel (Physical Uplink Shared Channel (PUSCH)). Additionally, uplink control information (UCI) is transmitted using the PUSCH in a case of being transmitted with uplink user data and is transmitted by using an uplink control channel (Physical Uplink Control Channel (PUCCH)) in a case of being solely transmitted.

The UCI includes acknowledgement information (ACK/NACK), a scheduling request, channel state information (CSI), and the like for a downlink shared channel (Physical Downlink Shared Channel (PDSCH)). The acknowledgement information may also be referred to as HARD-ACK (Hybrid Automatic Repeat reQuest-Acknowledgement), ACK/NACK (A/N), retransmission control information, and so on.

The CSI is information based on an instantaneous downlink channel state, and is, for example, a channel quality indicator (CQI), a precoding matrix indicator (PMI), a precoding type indicator (PTI), a rank indicator (RI), or the like. The CSI is periodically or aperiodically reported from the UE to the eNB.

For the periodic CSI (P-CSI), the UE periodically transmits the CSI, based on a period and/or resources reported from the radio base station. On the other hand, for the aperiodic CSI (A-CSI), the UE transmits the CSI in response to a CSI report request (also referred to as a trigger, a CSI trigger, a CSI request, and so on) from the radio base station.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, LTE Rel. 14, Rel. 15, or later versions, 5G, NR, and so on), studies have been conducted about control of the CSI reporting using a configuration different from the configurations in the existing LTE systems (for example, LTE Rel. 13 or former versions).

For example, it is assumed that the base station semi-statically (semi-persistently) configures CSI measurement resources and/or CSI reporting for the UE and that the UE provides the CSI reporting to the base station. In a case where the configuration different from the configurations in the existing LTE systems is employed for the CSI reporting, it is difficult to employ a control method for the CSI reporting in any of the existing LTE systems without any change.

The present invention has been made in view of the above, and it is therefore an object of the present invention to provide a user terminal and a radio communication method that can appropriately control the CSI reporting in a case where the configuration different from the configurations in the existing LTE systems is employed for communication.

Solution to Problem

A user terminal according to an aspect of the present invention includes: a receiving section that receives information indicating whether to activate or deactivate channel state information reporting, in at least one of first downlink control information indicating UL transmission specifically to the user terminal, second downlink control information indicating the UL transmission to a plurality of user terminals, and MAC control information; and a control section that controls reporting of channel state information, based on the information indicating whether to activate or deactivate the channel state information reporting.

Advantageous Effects of Invention

According to the present invention, CSI reporting can be appropriately controlled in a case where a configuration different from the configurations in the existing LTE systems is employed for communication.

BRIEF DESCRIPTION OF DRAWINGS

FIG. 1 is a diagram to show an example of UE-specific DCI utilized for reporting of activation/deactivation of CSI reporting;

FIG. 4 is a diagram to show an example of UE-common DCI utilized for reporting of activation/deactivation of the CSI reporting;

DESCRIPTION OF EMBODIMENTS

Figure 2:
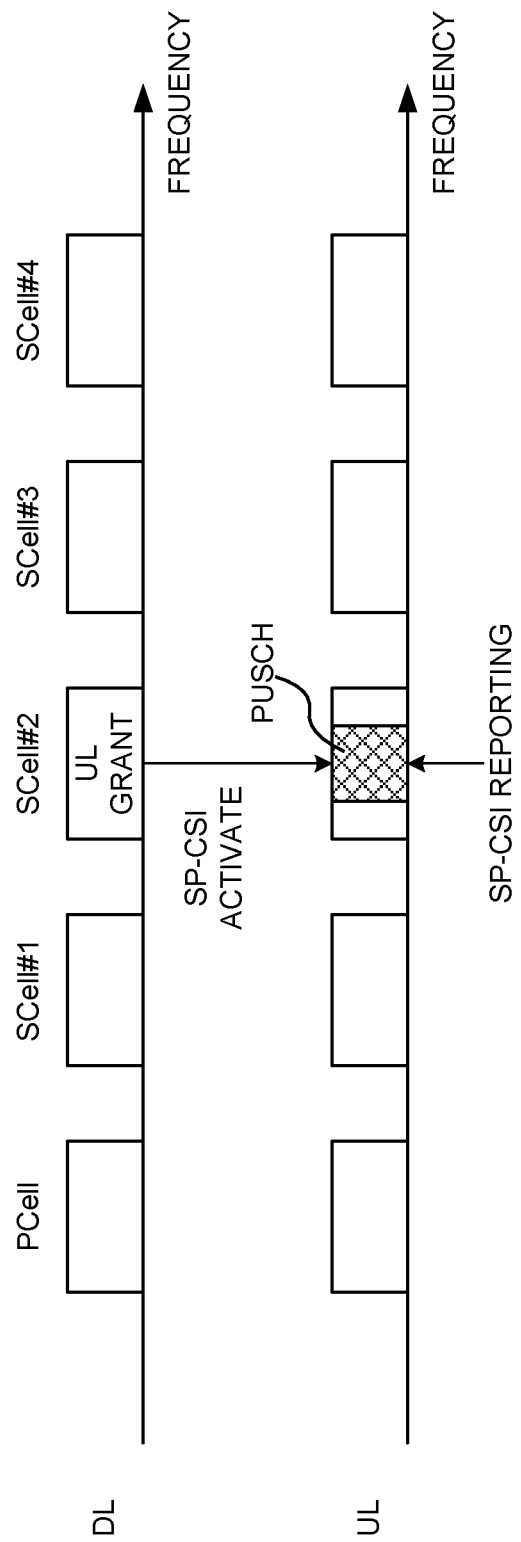
FIG. 2 is a diagram to show an example of self-carrier activation/deactivation of the CSI reporting by utilizing DCI.

For existing LTE systems (Rel. 10 to Rel. 13), a reference signal measuring a channel state in downlink has been specified. The reference signal for channel state measurement is a reference signal also referred to as a Cell-specific Reference Signal (CRS) or a Channel State Information-Reference Signal (CSI-RS) and used to measure CSI such as Channel Quality Indicator (CQI), Precoding Matrix Indicator (PMI), Rank Indicator (RI), and so on, which indicate the channel state.

A user terminal (UE) feeds back results of measurement based on the reference signal for channel state measurement to a radio base station as the channel state information (CSI) at a certain timing. As a CSI feedback method, periodic CSI reporting (P-CSI) and aperiodic CSI reporting (A-CSI) are specified.

For periodic CSI reporting, the UE feeds back the P-CSI at each certain period (for example, 5 subframe period, 10 subframe period, and so on). The UE provides control to perform the P-CSI reporting by using an uplink control channel (for example, PUCCH). In a case where CA is employed, the UE performs transmission of the P-CSI by using an uplink control channel in a certain cell (for example, a PCell, a PUCCH cell, or a PSCell).

For aperiodic CSI reporting, the UE transmits the A-CSI in response to a CSI trigger (CSI request) from the radio base station. For example, the UE performs the A-CSI reporting once certain timings (for example, 4 subframes) after the reception of the CSI trigger.

The UE can utilize the CRS transmitted in each subframe to measure the channel state. In this case, the UE reports the result (CSI) of the measurement to the radio base station at a certain timing.

Incidentally, for future radio communication systems (also referred to as 5G/NR), studies have been conducted about CSI reporting using a configuration different from the configurations in the existing LTE systems. For example, CSI reporting has been contemplated that utilizes a plurality of CSI types varying in information type and/or size reported. The information types reported in the CSI may be referred to as CSI parameters, CSI feedback parameters, or CSI information.

A plurality of the CSI types may be configured according to intended use (or a communication function). For example, a CSI type may be defined that is configured for communication utilizing a single beam (this type is also referred to as type 1-CSI) and a CSI type may be defined that is configured for communication utilizing multibeams (this type is also referred to as type 2 CSI). Of course, no such limitation on the intended use of the CSI type is intended.

The UE and the base station may utilize the type 1-CSI to maintain a coarse link utilizing a single beam. The UE and the base station may utilize the type 2-CSI to make a connection utilizing multibeams (for example, a plurality of layers). For example, the type 2-CSI may include information for each layer (or beam related information such as a beam number).

Control may be provided to report only some CSI parameters included in the information types (CSI parameters) of the type 2-CSI. The CSI including some information types may be referred to as partial type 2-CSI (partial Type 2 CSI).

For the future radio communication systems, studies have been conducted about definition of a plurality of CSI reporting periods (or reporting timings) and association, with each reporting period, at least one of a reported frequency granularity, a physical channel utilized for CSI reporting, and a codebook (or the CSI type).

For example, in a case where the CSI reporting is periodically performed (Periodic CSI (P-CSI)), the wideband and/or partial band is utilized as a frequency granularity, a short PUCCH and/or a long PUCCH is utilized as a physical channel, and the type 1-CSI is utilized as a codebook. For periodic CSI reporting, higher layer signaling (for example, RRC signaling) is utilized to configure, for the UE, at least one of a reporting period, PUCCH resources utilized, and the CSI type.

For semi-persistent CSI reporting (Semi-periodic CSI (SP-CSI)), at least one of the wideband, partial band, and subband is utilized as a frequency granularity, the PUCCH and/or a PUSCH is utilized as a physical channel, and the type 1-CSI and/or the partial type 2 CSI is utilized as a codebook. The partial type 2-CSI may be configured to be transmitted over the long PUCCH. For semi-persistent CSI reporting, MAC control information (Media Access Control Control Element (MAC CE)) can be utilized to configure the partial type 2 CSI or the like for the UE. Note that, besides the MAC CE, downlink control information may be utilized.

For aperiodic CSI reporting (A-CSI, Aperiodic CSI), at least one of the wideband, partial band, and subband is utilized as a frequency granularity, the PUSCH and/or a short PUCCH is utilized as a physical channel, and the type 1-CSI and/or the type 2-CSI is utilized as a codebook. For the aperiodic CSI reporting, the downlink control information can be utilized to configure the UE.

The SP-CSI reporting may be larger in size than the P-CSI reporting. The A-CSI reporting may be larger in size than the SP-CSI reporting. The size as used herein means the number of bits or a payload for expressing reported information.

It is assumed that the periodic CSI (P-CSI) reporting and the aperiodic CSI (A-CSI) reporting are controlled by utilizing a mechanism similar to the mechanism of the existing LTE systems. On the other hand, the semi-persistent CSI (SP-CSI) reporting is not supported by the existing LTE systems. Thus, the problem is how to control the SP-CSI reporting.

For example, the SP-CSI reporting needs execution of activation/deactivation. When the SP-CSI reporting is activated, the SP-CSI reporting and/or measurement for the SP-CSI is periodically performed until a deactivation command is received or a timer is expired.

However, how to activate/deactivate the CSI reporting has not been determined, and appropriate control of activation/deactivation and so on of the SP-CSI reporting is desirable.

The inventors of the present invention studied signaling of activation/deactivation of the CSI reporting and came up with the idea of control utilizing a certain control signal. In an aspect of the present embodiment, the activation/deactivation of the CSI reporting is controlled by utilizing at least one of first downlink control information indicating UL transmission specifically to the user terminal, second downlink control information indicating UL transmission commonly to certain user terminals (for example, to a plurality of user terminals), and MAC control information.

Embodiments according to the present invention will be described in detail with reference to the drawings as follows. Configurations shown in the embodiments may be employed independently or may be employed in combination.

(First Aspect)

A first aspect illustrates a case in which downlink control information configured specific to the UE (for example, a UE-specific search space) is utilized to report the activation/deactivation of the CSI reporting to the UE.

Note that the following description takes, as an example of the downlink control information, downlink control information indicating UL transmission (UL grant) but that no such limitation is intended. Any downlink control information (DCI) may be employed for other DCI (for example, DCI used to schedule DL (DL assignment) and so on) as long as the downlink control information (DCI) is configured specific to the UE (or reported to the UE). The configuration illustrated in the following description may be employed to activate/deactivate CSI-RS resources measured by the UE.

By using UE-specific downlink control information (UL grant), the base station reports an activation command or the deactivation command controlling start or stop of the SP-CSI reporting in the UE. Note that a UE-specific UL grant may be referred to as a non-fallback UL grant, a first UL grant, UL grant type 1, or the like.

For the non fallback UL grant, the size of the DCI may be changed after RRC reconfiguration. For example, the number of bits in a carrier identification field (CIF) included in the DCI may be changed according to the number of CCs (re)configured or the like, and a certain bit field may be added/deleted in accordance with a (re)configured MIMO transmission mode, the presence or absence of configuration of code block group retransmission control, or the like.

FIG. 1 is a diagram to show an example of information (or a field) included in UE-specific DCI utilized for reporting of activation/deactivation of the CSI reporting. Note that the information included in the DCI is not limited to the configuration shown in FIG. 1. The configuration may include only a part of the information illustrated in FIG. 1 or may include other information.

Reporting of activation/deactivation of the CSI reporting may be performed by utilizing certain information (or a field). For example, the activation/deactivation may be designated for the UE by utilizing a bit value in a field designating PUSCH resources (for example, PUSCH resources (Frequency-domain PUSCH resources) field in a frequency domain in FIG. 1). Of course, any other field may be utilized.

Alternatively, a reporting field (for example, 1 bit) may be provided that is used for reporting the activation/deactivation of the CSI reporting. In this case, the UE controls the activation/deactivation of the SP-CSI reporting, based on the reporting field included in the DCI.

In a case where the activation of the CSI reporting is indicated in the UL grant, the UE starts the CSI reporting, based on certain conditions. The conditions utilized for transmission of the CSI reporting may be specified for the UE by using higher layer signaling and/or the UL grant.

The base station reports information related to parameters employed for the transmission of the CSI reporting (for example, the waveform and/or period of the PUSCH and so on utilized for the CSI reporting) to the UE through the higher layer signaling (for example, RRC signaling and so on). For example, for the uplink, in a case where a waveform based on a different transmission scheme (which may also be referred to as a multiplexing scheme, a modulation scheme, an access scheme, a waveform scheme, and so on) is supported, a certain waveform is reported to the UE.

Examples of the waveform utilized for the CSI reporting include a cyclic prefix OFDM (Cyclic prefix Orthogonal Frequency Division Multiplexing (CP-OFDM))-based waveform and a DFT spread OFDM (Discrete Fourier Transform Spread Orthogonal Frequency Division Multiplexing (DFT-S-OFDM))-based waveform.

Note that the CP-OFDM waveform may be referred to as a multicarrier transform scheme waveform and that the DFT-S-OFDM waveform may be referred to as a single carrier transmission scheme waveform. The waveform may be characterized by the presence or absence of employment of DFT precoding (spreading) for the OFDM waveform. For example, the CP-OFDM may be referred to as a waveform (signal) for which the DFT precoding is not employed, and the DFT-S-OFDM may be referred to as a waveform (signal) for which the DFT precoding is employed.

Alternatively, information related to the waveform and/or period of the PUSCH and so on utilized for the CSI reporting may be specified in the downlink control information (for example, the UL grant indicating activation).

The base station may indicate resources utilized for the CSI reporting (for example, PUSCH resources) to the UE in the UL grant indicating the activation of the CSI reporting (see FIG. 1). Alternatively, the higher layer signaling (or a combination of the UL grant and the higher layer signaling) may be used to indicate information related to resources.

A Cyclic Redundancy Check (CRC) on the downlink control information indicating the activation/deactivation of the CSI reporting (UL grant) may be configured to be masked by a RNTI configured for the CSI reporting (which is also referred to as, for example, SP-CSI-RNTI). The SP-CSI-RNTI may be configured specific to the UE by utilizing the higher layer signaling or the like from the base station to the UE. Thus, when receiving the DCI masked by the SP-CSI-RNTI, each UE can judge that the DCI designates the SP-CSI reporting.

Alternatively, the CRC on the UL grant indicating the activation/deactivation of the CSI reporting may be masked by RNTI utilized for any other purpose (for example, SPS-C-RNTI, GF-C-RNTI, or C-RNTI). This allows saving of an RNTI value that can be expressed in a certain number of bits (for example, 16 bits). Note that the GF-C-RNTI corresponds to RNTI employed in the DCI in a case where the UE is configured with a mode (UL grant free) in which PUSCH transmission is performed without a UL transmission indication (UL grant). In a case where the CRC on the UL grant indicating the activation/deactivation of the CSI reporting is configured to be masked by the RNTI utilized for any other purpose (for example, SPS-C-RNTI, GF-C-RNTI, or C-RNTI), specific one or a plurality of bit fields may be fixed to a specific bit value. In this case, even with the same RNTI, the UL grant can be distinguished that indicates the activation/deactivation of the CSI reporting.

In a case where the activation/deactivation of the CSI reporting utilizing the PUSCH is indicated in the UL grant, the UE may utilize MAC control information (MAC CE) to perform acknowledgement for the activation/deactivation indication (UL grant). In this case, the UE includes the MAC CE in the PUSCH for transmission.

<UL Grant and Cell for CSI Reporting>

The SP-CSI reporting may be configured to performed by utilizing the PUSCH on a secondary cell (SCell).

In this case, the UL grant indicating the activation/deactivation of the CSI reporting may be configured to activate/deactivate (self-carrier activate/deactivate) the CSI reporting in the same carrier (CC) as that in which the UL grant is transmitted (see FIG. 2).

For example, the base station utilizes the UL grant transmitted on a certain secondary cell (SCell #2 in FIG. 2) to indicate the activation/deactivation of the SP-CSI reporting utilizing the PUSCH on SCell #2. In a case where the UL grant transmitted on the certain SCell activates the CSI reporting, the UE starts the CSI reporting using a PUSCH in the certain SCell.

In a case of performing the SP-CSI reporting by using the PUSCH on SCell #2, the UE may exclusively report the CSI for SCell #2 or report the CSI for another cell (PCell and/or another SCell). Note that FIG. 2 illustrates that four SCells are configured but that no such limitation on the number of SCells that can be configured is intended.

By thus performing the SP-CSI reporting utilizing the PUSCH on the SCell, transmission of the SP-CSI reporting can be flexibly configured. Allowing the CSI reporting in the SCell can suppress concentration of the CSI reporting at the primary cell (PCell).

Figure 3:
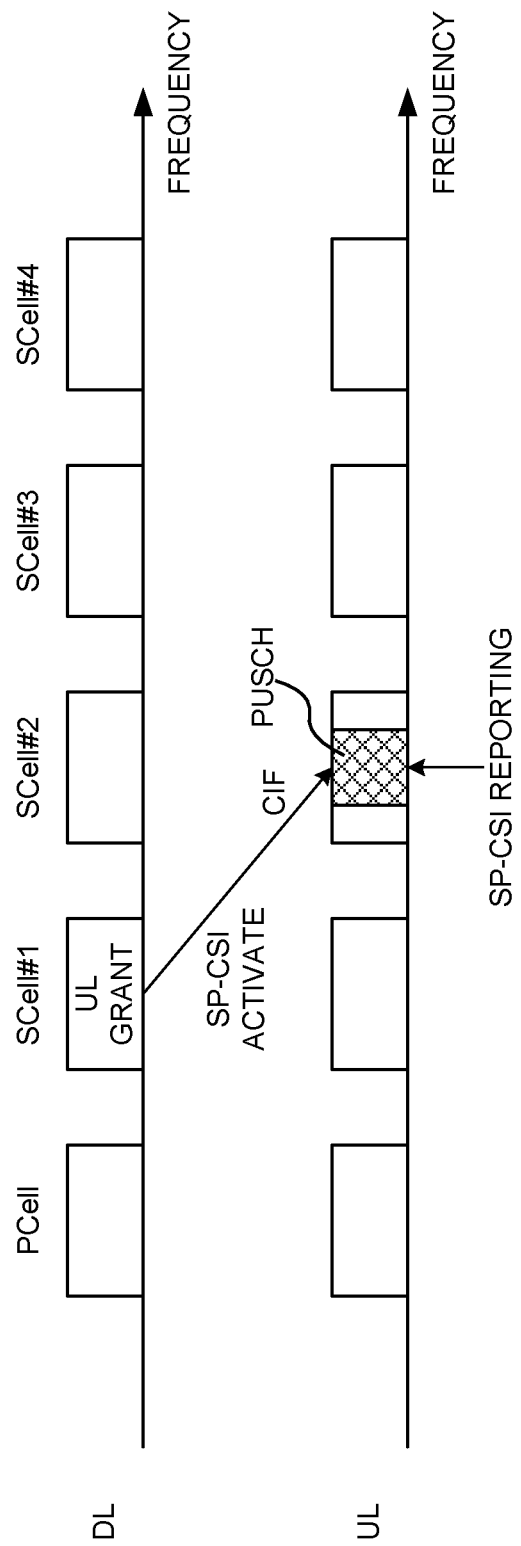
FIG. 3 is a diagram to show an example of cross-carrier activation/deactivation of the CSI reporting by utilizing the DCI.

Alternatively, the UL grant indicating the activation/deactivation of the CSI reporting may activate/deactivate the CSI reporting in a carrier (or CC or cell) different from the carrier in which the UL grant is transmitted (cross carrier activate/deactivate) (see FIG. 3).

For example, the base station utilizes the UL grant transmitted on a certain SCell (SCell #1 in FIG. 3) to indicate the activation/deactivation of the SP-CSI reporting utilizing the PUSCH on another SCell (SCell #2 in FIG. 3). In this case, the base station may utilize a certain field included in the UL grant (for example, CIF) to indicate another cell in which the CSI reporting is to be activated/deactivated (here, SCell #2).

In a case where the UL grant transmitted on the certain SCell (SCell #1) activates the CSI reporting in another SCell (SCell #2), the UE starts the CSI reporting utilizing the PUSCH on SCell #2. In a case of performing the SP-CSI reporting by using the PUSCH on SCell #2, the UE may exclusively report the CSI for SCell #2 or report the CSI for another cell (PCell and/or another SCell).

In this case, the base station may report, to the UE, information related to the carrier intended for CSI reporting (or CSI-RS resources to be measured). For example, the base station may configure a combination of designation of the cell in which PUSCH transmission for the CSI reporting is performed and the carrier intended for the CSI reporting (for example, by utilizing the UL grant).

Alternatively, the base station may report, in the UL grant (for example, CIF), the cell in which the PUSCH transmission for the CSI reporting is performed to configure, through the higher layer signaling such as RRC, the carrier intended for the CSI reporting. The combination of the carrier intended for the CSI reporting and the carrier in which the CSI reporting is performed may be reported in the MAC CE activating the SP-CSI-RS transmission. Note that the cell intended for the CSI reporting may always be the same as the cell in which the PUSCH transmission for the CSI reporting is performed.

As described above, the cross carrier activation/deactivation enables configuration of the cell for transmission of the UL grant and the cell in which the CSI reporting is performed in different manners, allowing the CSI reporting to be flexibly configured.

The SP-CSI reporting may exclusively utilize the PUSCH on a certain cell (for example, PCell, PSCell, or PUCCH SCell). In this case, the UE starts the CSI reporting utilizing the PUCCH on a certain cell (for example, PCell) in a case where the UL grant activates the SP-CSI. In this case, the UL grant indicating the activation/deactivation of the SP-CSI reporting may be transmitted exclusively on the certain cell or may be transmitted on another SCell.

(Second Aspect)

A second aspect illustrates a case in which the activation/deactivation of the CSI reporting is reported to the UE by utilizing downlink control information configured common to the UEs (for example, a UE-common search space). The downlink control information configured common to the UEs may be downlink control information configured common to a certain UE group (for example, DCI utilizing a group common search space).

Note that the following description takes, as an example of the downlink control information, downlink control information indicating UL transmission (UL grant) but that no such limitation is intended. Any downlink control information (DCI) may be employed for other DCI (for example, DCI used to schedule DL (DL assignment) and so on) as long as the downlink control information (DCI) is configured common to the UEs (or reported commonly to the UEs). The configuration illustrated in the following description may be employed to activate/deactivate CSI-RS resources measured by the UE.

By using UE-common downlink control information (UL grant), the base station reports the activation command or the deactivation command controlling start or stop of the SP-CSI reporting in the UE. Note that a UE-common UL grant may be referred to as a fallback UL grant, a second UL grant, UL grant type 2, or the like.

For the fallback UL grant, the size of the DCI remains unchanged after the RRC reconfiguration. Thus, the contents of the DCI are not changed according to the number of CCs (re)configured or the like, and thus the fallback UL grant includes no field in which the number of bits or the like may be changed after the RRC (re)configuration (for example, the carrier identification field (CIF)) (see FIG. 4).

FIG. 4 is a diagram to show an example of information (or a field) included in the UE-common DCI utilized for reporting of activation/deactivation of the CSI reporting. Note that the information included in the DCI is not limited to the configuration shown in FIG. 4. The configuration may include only a part of the information illustrated in FIG. 4 or may include other information.

Reporting of activation/deactivation of the CSI reporting may be performed by utilizing certain information (or a field). For example, the activation/deactivation may be designated for the UE by utilizing a bit value in a field designating PUSCH resources (for example, Frequency-domain PUSCH resources in FIG. 4). Of course, any other field may be utilized.

Alternatively, a reporting field (for example, 1 bit) may be provided that is used for reporting the activation/deactivation of the CSI reporting. In this case, the UE controls the activation/deactivation of the SP-CSI reporting, based on the reporting field included in the DCI.

In a case where the activation of the CSI reporting is indicated in the UL grant configured common to the UEs, each UE starts the CSI reporting, based on certain conditions. The conditions utilized for transmission of the CSI reporting may be specified for the UE by using system information and/or the UL grant. For the system information, the minimum system information required for communication (RMSI (Remaining Minimum System Information) necessary for communication may be utilized.

The base station reports information related to parameters employed for the transmission of the CSI reporting (for example, the waveform and/or period of the PUSCH and so on utilized for the CSI reporting) to the UE by using the system information (for example, RMSI). For the uplink, in a case where a waveform based on a different transmission scheme (which may also be referred to as a multiplexing scheme, a modulation scheme, an access scheme, a waveform scheme, and so on) is supported, a certain waveform is reported to the UE. Alternatively, information related to the waveform and/or period of the PUSCH and so on utilized for the CSI reporting may be specified in the downlink control information (for example, the UL grant indicating activation).

Resources utilized for the CSI reporting (for example, PUSCH resources) may be indicated to the UE in the UL grant indicating the activation of the CSI reporting (see FIG. 4). Alternatively, the system information (or a combination of the UL grant and the system information) may be used to indicate information related to resources.

A CRC on the UE-common downlink control information indicating the activation/deactivation of the CSI reporting (UL grant) may be masked by the RNTI configured for the CSI reporting (which is also referred to as, for example, SP-CSI-RNTI). The SP-CSI-RNTI may be configured common to the UEs by utilizing the system information or the like from the base station to the UEs. Thus, when receiving the DCI masked by the SP-CSI-RNTI, each UE can judge that the DCI designates the SP-CSI reporting.

Alternatively, the CRC on the UL grant indicating the activation/deactivation of the CSI reporting may be masked by the RNTI utilized for any other purpose (for example, SPS-C-RNTI, GF-C-RNTI, or C-RNTI). This allows saving of the RNTI value that can be expressed in a certain number of bits (for example, 16 bits).

The UE-common DCI may be received by a plurality of UEs, the UE need not transmit acknowledgement information for the activation command or the deactivation command. The base station may control the SP-CSI on the assumption that the UE can receive the activation command or the deactivation command.

The use of the UE-common DCI enables a plurality of UEs to receive the activation command or the deactivation command, allowing overhead of reporting to be suppressed.

<UL Grant and Cell for CSI Reporting>

In the existing systems, the UE-common DCI (common search space) is transmitted only on the primary cell (PCell). As described above, the UE-common DCI includes no field designating any other cell (CIF).

Figure 5:
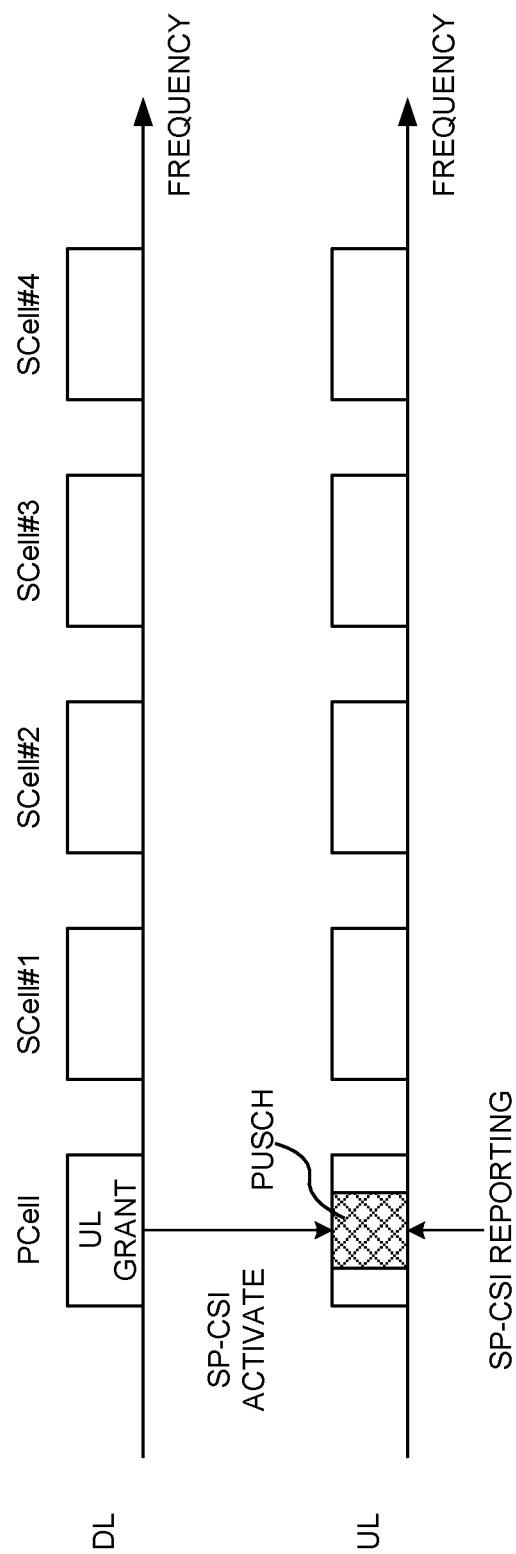
FIG. 5 is a diagram to show an example of activation/deactivation of the CSI reporting by utilizing the UE-common DCI.

Thus, in a case where the UE-common DCI indicating the activation/deactivation of the SP-CSI reporting is allowed to be transmitted only on the primary cell, the SP-CSI reporting may be performed by exclusively utilizing the PUSCH on a certain cell (for example, PCell) (see FIG. 5).

For example, the base station utilizes the UL grant transmitted on a certain cell (PCell in FIG. 5) to indicate the activation/deactivation of the SP-CSI reporting utilizing the PUSCH on the PCell. In a case where the UE-common DCI (UL grant) transmitted on the PCell activates the CSI reporting, the UE starts the CSI reporting utilizing the PUSCH on the PCell.

Thus, even in a case where the UE-common DCI is utilized that is transmitted only on the certain cell and that includes no CIF, the activation/deactivation of the SP-CSI reporting can be appropriately controlled.

(Third Aspect)

A third aspect illustrates a case in which the activation/deactivation of the CSI reporting is reported to the UE by utilizing MAC control information (MAC CE).

By using the MAC control information (MAC CE), the base station reports the activation command or the deactivation command controlling start or stop of the SP-CSI reporting in the UE.

In this case, the MAC CE transmitted on the downlink shared channel (PDSCH) may include the activation command or the deactivation command for CSI reporting. The DL DCI used for scheduling the PDSCH and including the MAC CE may include a PDSCH allocation field used for scheduling the PDSCH.

The UE may transmit, to the base station, the acknowledgement information for the activation command or the deactivation command by using HARQ-ACK for providing feedback to the PDSCH. The DL DCI used for scheduling the PDSCH and including the MAC CE may include a PUCCH resource indication field indicating PUCCH resources for HARQ-ACK.

For example, the higher layer signaling may be used to configure a PUCCH resource set for the UE, and the PUCCH resource indication field may indicate one of the PUCCH resources in the set. The UE may determine the PUCCH resource, based on the PUCCH resource indication field and use the determined PUCCH resource to transmit 1-bit HARQ-ACK. Thus, the base station can check whether the UE can have received the activation command or the deactivation command normally and appropriately perform subsequent scheduling control.

Even in a case where the MAC CE is used for the activation command or the deactivation command, the UE can use the PUCCH to transmit the acknowledgement information, thus allowing suppression of overhead and/or delay of reporting.

(Radio Communication System)

Hereinafter, a structure of a radio communication system according to one embodiment of the present invention will be described. In this radio communication system, the radio communication method according to each embodiment of the present invention described above may be used alone or may be used in combination for communication.

Figure 6:
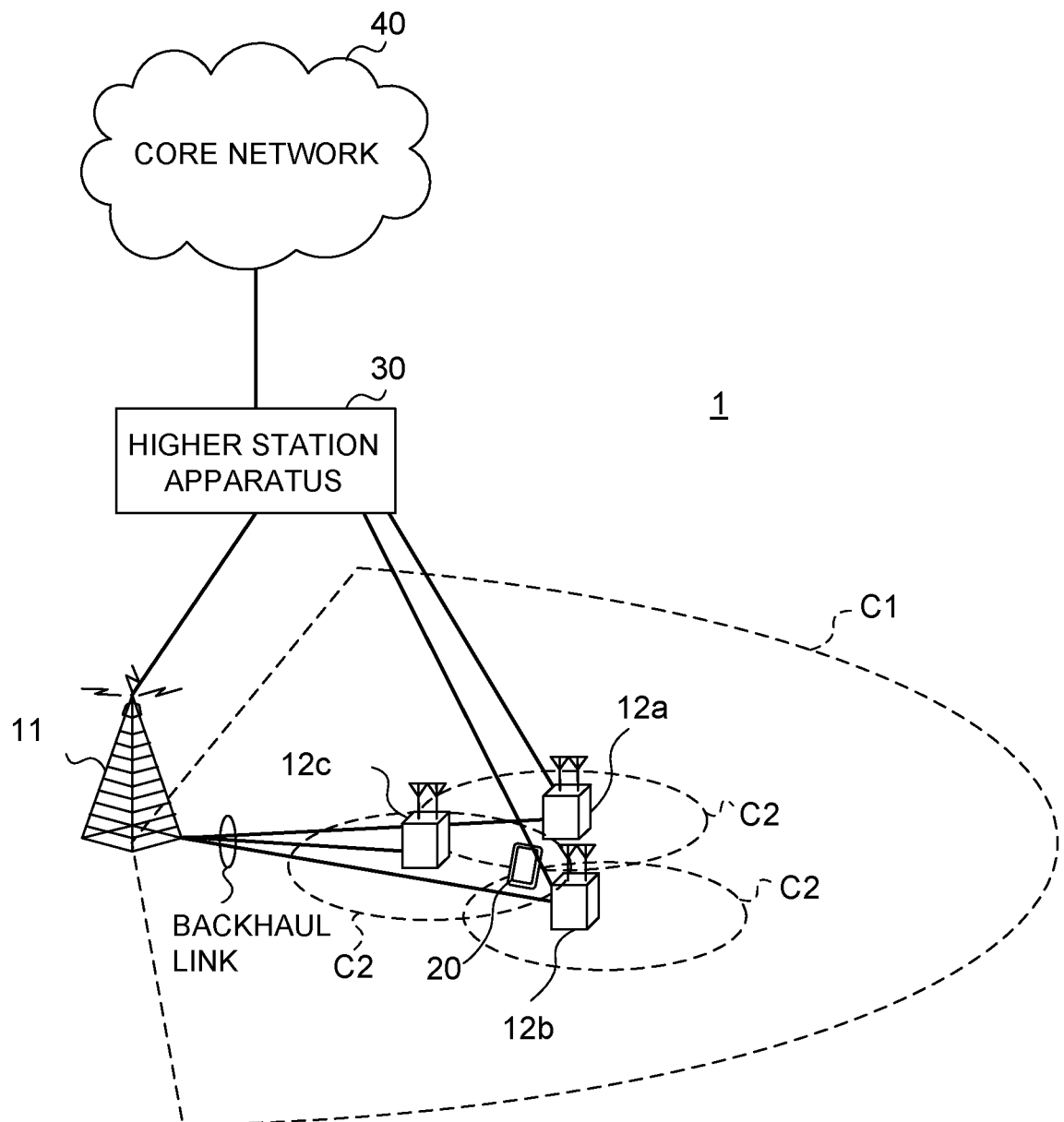
FIG. 6 is a diagram to show an example of a schematic structure of a radio communication system according to one embodiment of the present invention.

FIG. 6 is a diagram to show an example of a schematic structure of the radio communication system according to one embodiment of the present invention. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "Long Term Evolution (LTE)," "LTE-Advanced (LTE-A)," "LTE-Beyond (LTE-B)," "SUPER 3G," "IMT-Advanced," "4th generation mobile communication system (4G)," "5th generation mobile communication system (5G)," "New Radio (NR)," "Future Radio Access (FRA)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 may adopt CA or DC by using a plurality of cells (CCs) (for example, five or less CCs, or six or more CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

A wired connection (for example, an optical fiber in compliance with the Common Public Radio Interface (CPRI), an X2 interface, and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "Home eNodeBs (HeNBs)," "Remote Radio Heads (RRHs)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (Physical Downlink Shared Channel (PDSCH)), which is used by each user terminal 20 on a shared basis, a broadcast channel (Physical Broadcast Channel (PBCH)), downlink L1/L2 control channels and so on, are used as downlink channels. User data, higher layer control information, System Information Blocks (SIBs) and so on are communicated on the PDSCH. Additionally, the Master Information Blocks (MIBs) are communicated on the PBCH.

The downlink L1/L2 control channels include a Physical Downlink Control Channel (PDCCH), an Enhanced Physical Downlink Control Channel (EPDCCH), a Physical Control Format Indicator Channel (PCFICH), a Physical Hybrid-ARQ Indicator Channel (PHICH) and so on. Downlink control information (DCI), including PDSCH and/or PUSCH scheduling information, and so on are communicated on the PDCCH.

Note that the scheduling information may be reported by the DCI. For example, the DCI scheduling DL data reception may be referred to as "DL assignment," and the DCI scheduling UL data transmission may be referred to as "UL grant."

The number of OFDM symbols to use for the PDCCH is communicated on the PCFICH. Acknowledgement information (for example, also referred to as "retransmission control information," "HARQ-ACK," "ACK/NACK," and so on) of Hybrid Automatic Repeat reQuest (HARQ) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on are used as uplink channels. User data, higher layer control information and so on are communicated on the PUSCH. In addition, radio quality information (Channel Quality Indicator (CQI)) of the downlink, delivery confirmation information, a scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (Sounding Reference Signal (SRS)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 7:
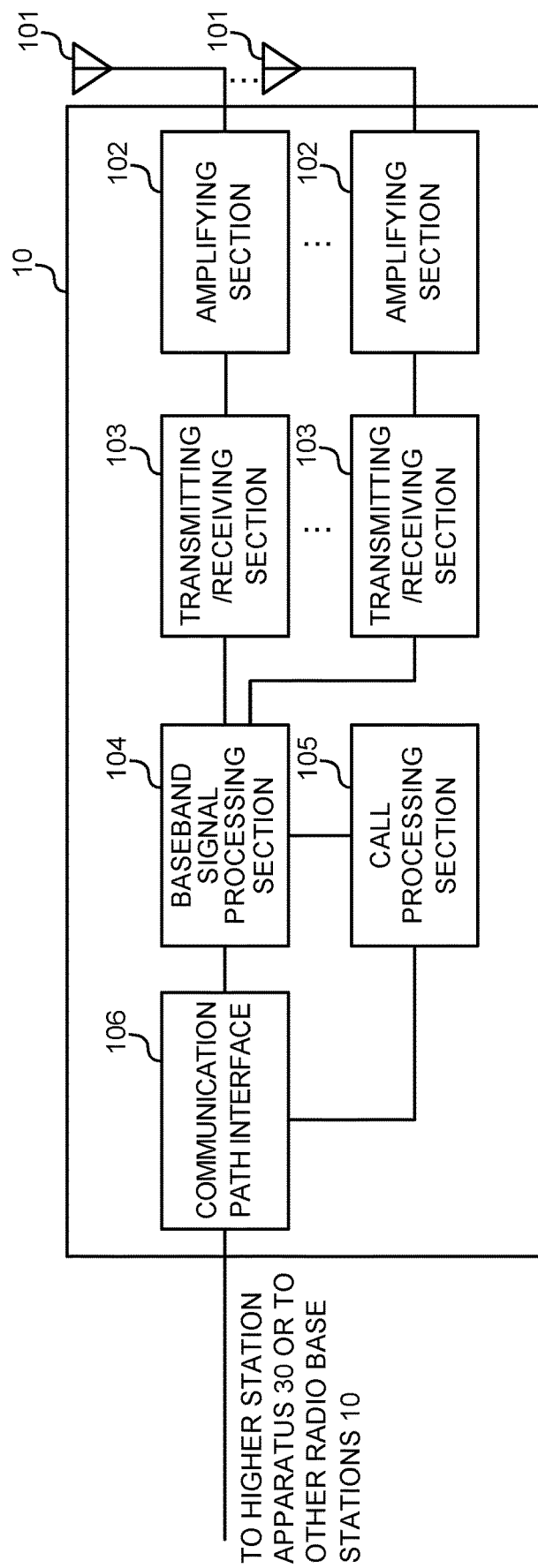
FIG. 7 is a diagram to show an example of an overall structure of a radio base station according to one embodiment of the present invention.

FIG. 7 is a diagram to show an example of an overall structure of the radio base station according to one embodiment of the present invention. A radio base station 10 includes a plurality of transmitting/receiving antennas 101, amplifying sections 102, transmitting/receiving sections 103, a baseband signal processing section 104, a call processing section 105 and a communication path interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the communication path interface 106.

In the baseband signal processing section 104, the user data is subjected to transmission processes, such as a Packet Data Convergence Protocol (PDCP) layer process, division and coupling of the user data, Radio Link Control (RLC) layer transmission processes such as RLC retransmission control, Medium Access Control (MAC) retransmission control (for example, an HARQ transmission process), scheduling, transport format selection, channel coding, an inverse fast Fourier transform (IFFT) process, and a precoding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present invention pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing (setting up, releasing and so on) for communication channels, manages the state of the radio base station 10, manages the radio resources and so on.

The communication path interface 106 transmits and/or receives signals to and/or from the higher station apparatus 30 via a certain interface. Additionally, the communication path interface 106 may transmit and/or receive signals (backhaul signaling) with other radio base stations 10 via an inter-base station interface (for example, an optical fiber in compliance with the Common Public Radio Interface (CPRI) and an X2 interface).

The transmitting/receiving sections 103 transmits information indicating the activation/deactivation of the CSI reporting by utilizing at least one of first downlink control information indicating UL transmission specifically to a UE, second downlink control information indicating the UL transmission commonly to UEs, and MAC control information.

In a case of indicating the activation of the CSI reporting in the first downlink control information, the transmitting/receiving sections 103 may transmit, through the higher layer signaling, information related to parameters employed for transmission of the CSI reporting. Alternatively, in a case of indicating the activation of the CSI reporting in the second downlink control information, the transmitting/receiving sections 103 may transmit, in the system information, the information related to the parameters employed for transmission of the CSI reporting. The transmitting/receiving sections 103 may transmit information designating or activating reference signal resources (for example, CSI-RS resources) for CSI measurement.

Figure 8:
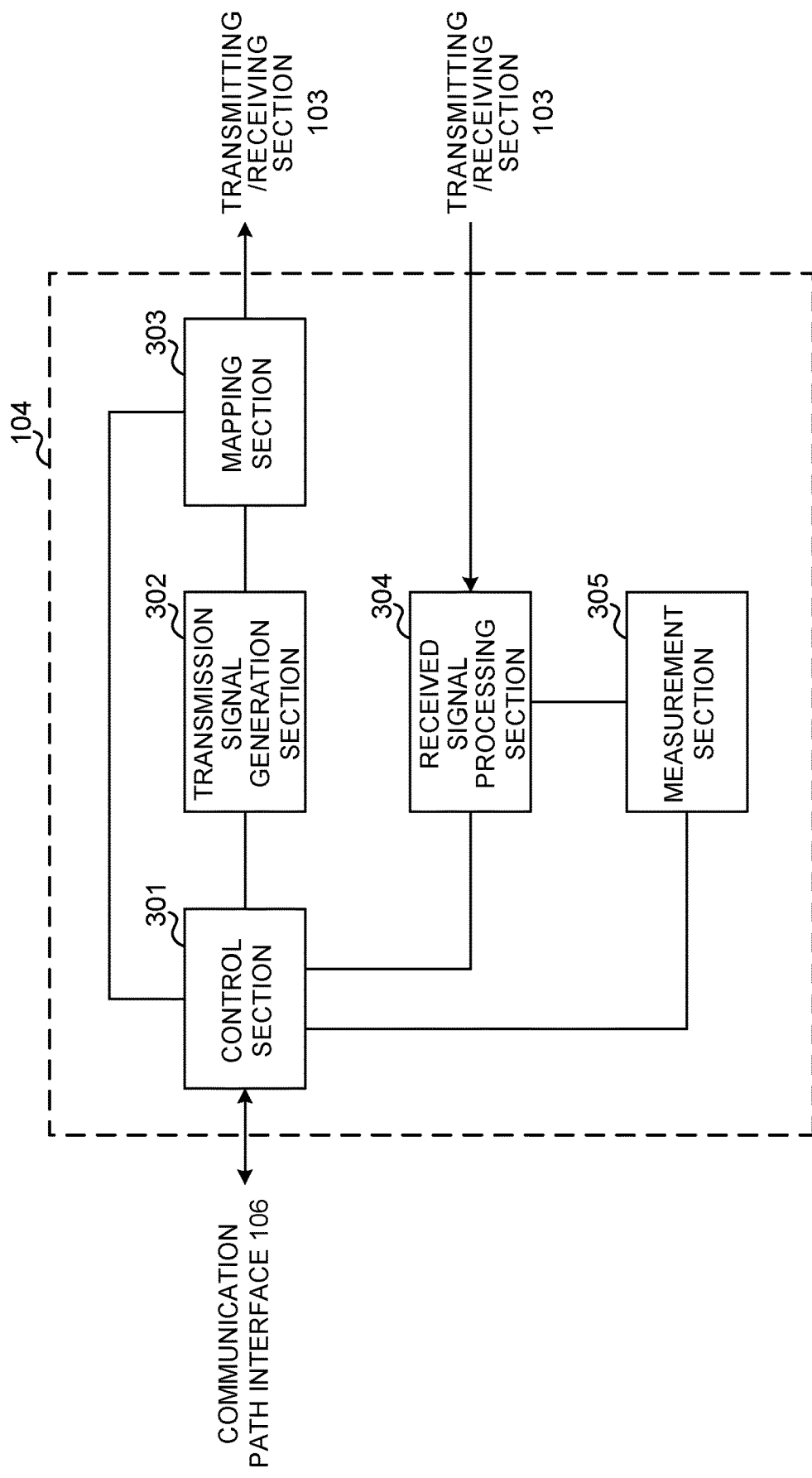
FIG. 8 is a diagram to show an example of a functional structure of the radio base station according to one embodiment of the present invention.

FIG. 8 is a diagram to show an example of a functional structure of the radio base station according to one embodiment of the present invention. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present invention pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls scheduling (for example, resource allocation) of system information, a downlink data signal (for example, a signal transmitted on a PDSCH), and a downlink control signal (for example, a signal transmitted on a PDCCH and/or an EPDCCH, delivery confirmation information, and so on). Based on the results of determining necessity or not of retransmission control to the uplink data signal, or the like, the control section 301 controls generation of a downlink control signal, a downlink data signal, and so on. The control section 301 controls the scheduling of a synchronization signal (for example, a Primary Synchronization Signal (PSS)/a Secondary Synchronization Signal (SSS)), a downlink reference signal (for example, a CRS, a CSI-RS, a DMRS), and so on.

The control section 301 controls scheduling of an uplink data signal (for example, a signal transmitted on a PUSCH), an uplink control signal (for example, a signal transmitted on a PUCCH and/or a PUSCH, delivery confirmation information, and so on), a random access preamble (for example, a signal transmitted on a PRACH), an uplink reference signal, and so on.

The control section 301 may control the secondary cell utilized for transmission of the CSI reporting and/or the secondary cell intended for the CSI reporting, based on information (for example, CIF) included in the first downlink control information and/or the higher layer signaling (for example, RRC signaling and so on).

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present invention pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) and so on from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present invention pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

For example, the measurement section 305 may perform Radio Resource Management (RRM) measurement, Channel State Information (CSI) measurement, and so on, based on the received signal. The measurement section 305 may measure a received power (for example, Reference Signal Received Power (RSRP)), a received quality (for example, Reference Signal Received Quality (RSRQ), a Signal to Interference plus Noise Ratio (SINR), a signal strength (for example, Received Signal Strength Indicator (RSSI)), channel information (for example, CSI), and so on. The measurement results may be output to the control section 301.

(User Terminal)

Figure 9:
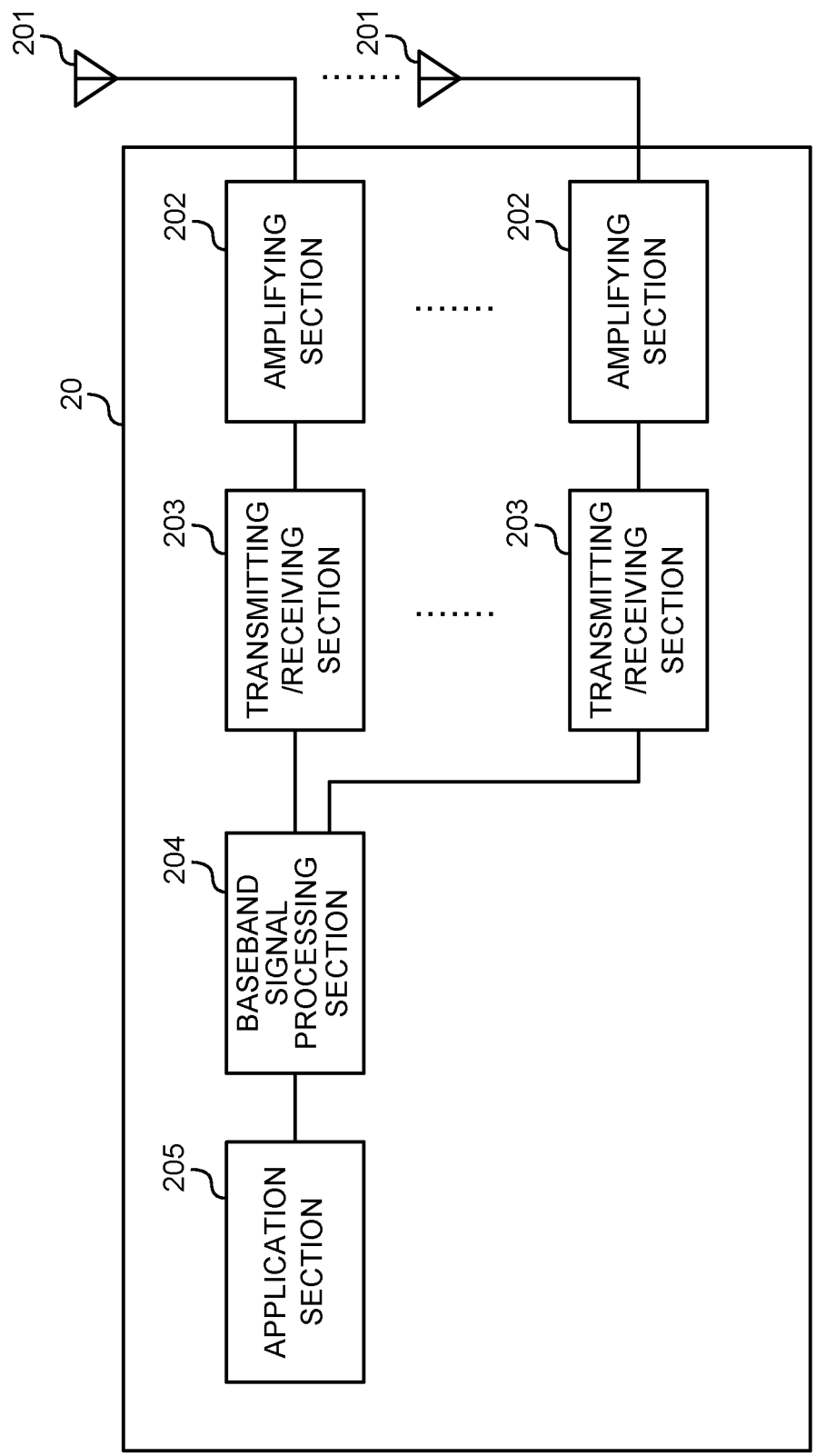
FIG. 9 is a diagram to show an example of an overall structure of a user terminal according to one embodiment of the present invention.

FIG. 9 is a diagram to show an example of an overall structure of a user terminal according to one embodiment of the present invention. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203. The transmitting/receiving sections 203 convert the baseband signals output from the baseband signal processing section 204 to have radio frequency band and transmit the result. The radio frequency signals having been subjected to frequency conversion in the transmitting/ receiving sections 203 are amplified in the amplifying sections 202, and transmitted from the transmitting/receiving antennas 201.

The transmitting/receiving sections 203 receive information indicating the activation/deactivation of the CSI reporting by utilizing at least one of the first downlink control information indicating the UL transmission specifically to the UE, the second downlink control information indicating the UL transmission commonly to the UEs, and the MAC control information.

In a case where the activation of the CSI reporting is indicated in the first downlink control information, the transmitting/receiving sections 203 may receive, through the higher layer signaling, information related to parameters employed for transmission of the CSI reporting. Alternatively, in a case where the activation of the CSI reporting is indicated in the second downlink control information, the transmitting/receiving sections 203 may receive, in the system information, the information related to the parameters employed for transmission of the CSI reporting. The transmitting/receiving sections 203 may receive information designating or activating reference signal resources (for example, CSI-RS resources) for CSI measurement.

Figure 10:
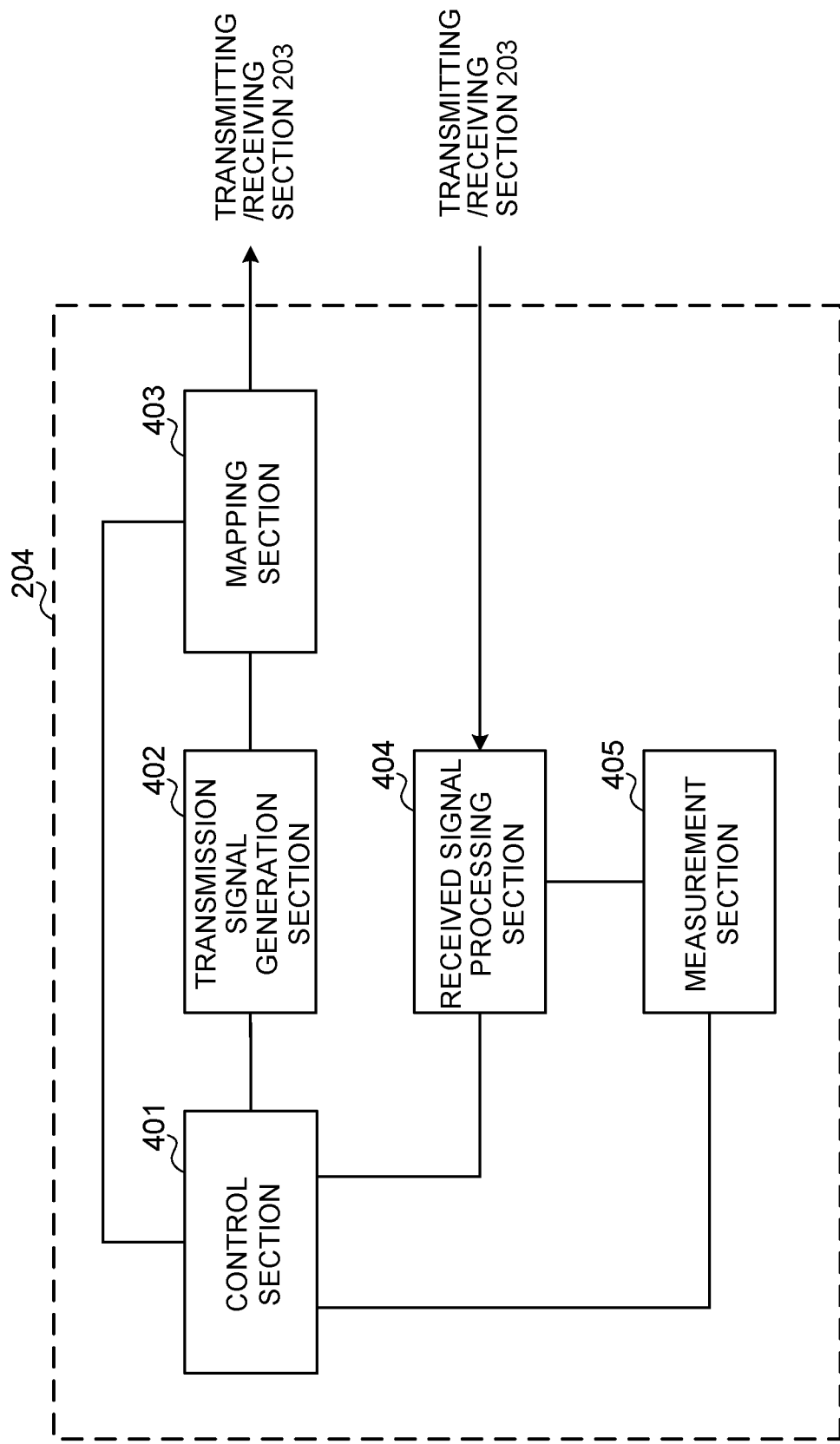
FIG. 10 is a diagram to show an example of a functional structure of the user terminal according to one embodiment of the present invention.

FIG. 10 is a diagram to show an example of a functional structure of a user terminal according to one embodiment of the present invention. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals in the transmission signal generation section 402, the mapping of signals by the mapping section 403, and so on. Additionally, the control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 controls the CSI reporting, based on the information indicating the activation/deactivation of the CSI reporting transmitted in at least one of the first downlink control information indicating the UL transmission specifically to the user terminal, the second downlink control information indicating the UL transmission commonly to the certain user terminals, and the MAC control information.

The control section 401 may determine the secondary cell utilized for transmission of the CSI reporting and/or the secondary cell intended for the CSI reporting, based on the information (for example, CIF) included in the first downlink control information and/or the higher layer signaling (for example, RRC signaling and so on).

In a case where the activation of the CSI reporting is indicated in the second downlink control information, the control section 401 may provide control to perform the CSI reporting by utilizing the uplink shared channel on the primary cell.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present invention pertains.

For example, the transmission signal generation section 402 generates an uplink control signal about delivery confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

For example, the measurement section 405 may perform RRM measurement, CSI measurement, and so on, based on the received signal. The measurement section 405 may measure a received power (for example, RSRP), a received quality (for example, RSRQ, SINR, SNR), a signal strength (for example, RSSI), channel information (for example, CSI), and so on. The measurement results may be output to the control section 401.

<Hardware Structure>

Note that the block diagrams that have been used to describe the above embodiments show blocks in functional units. These functional blocks (components) may be implemented in arbitrary combinations of hardware and/or software. Also, the method for implementing each functional block is not particularly limited. That is, each functional block may be realized by one piece of apparatus that is physically and/or logically aggregated, or may be realized by directly and/or indirectly connecting two or more physically and/or logically separate pieces of apparatus (via wire and/or wireless, for example) and using these plurality of pieces of apparatus.

Figure 11:
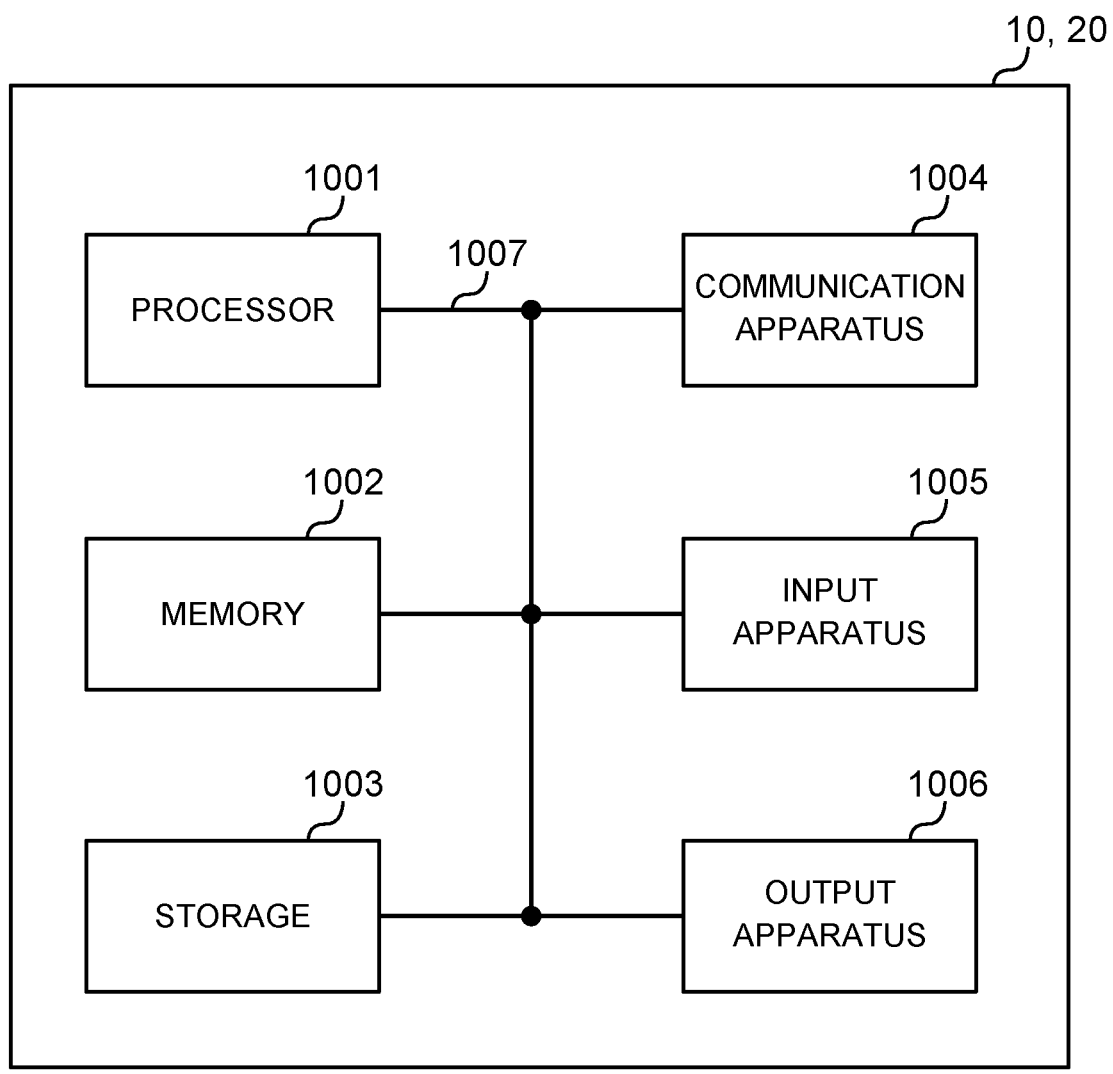
FIG. 11 is a diagram to show an example of a hardware structure of the radio base station and the user terminal according to one embodiment of the present invention.

For example, a radio base station, a user terminal, and so on according to one embodiment of the present invention may function as a computer that executes the processes of the radio communication method of the present invention. FIG. 11 is a diagram to show an example of a hardware structure of the radio base station and the user terminal according to one embodiment of the present invention. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with one or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control reading and/or writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from the storage 1003 and/or the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present invention.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via a wired and/or wireless network, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, frequency division duplex (FDD) and/or time division duplex (TDD). For example, the above-described transmitting/receiving antennas 101 (201), amplifying sections 102 (202), transmitting/receiving sections 103 (203), communication path interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in this specification and/or the terminology that is needed to understand this specification may be replaced by other terms that convey the same or similar meanings. For example, "channels" and/or "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Furthermore, a slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology. A slot may include a plurality of mini-slots. Each mini-slot may be constituted of one or a plurality of symbols in the time domain. A mini-slot may be referred to as a "sub-slot."

A radio frame, a subframe, a slot, a mini-slot, and a symbol all express time units in signal communication. A radio frame, a subframe, a slot, a mini-slot, and a symbol may each be called by other applicable terms. For example, one subframe may be referred to as a "transmission time interval (TTI)," a plurality of consecutive subframes may be referred to as a "TTI" or one slot or one mini-slot may be referred to as a "TTI." That is, a subframe and/or a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, and/or codewords, or may be the unit of processing in scheduling, link adaptation, and so on. Note that, when TTIs are given, the time interval (for example, the number of symbols) to which transport blocks, code blocks, and/or codewords are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe" and so on. A TTI that is shorter than a normal TTI may be referred to as a "shortened TTI," a "short TTI," a "partial or fractional TTI," a "shortened subframe," a "short subframe," a "mini-slot," a "sub-slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. Also, an RB may include one or a plurality of symbols in the time domain, and may be one slot, one mini-slot, one subframe, or one TTI in length. One TTI and one subframe each may be constituted of one or a plurality of resource blocks. Note that one or a plurality of RBs may be referred to as a "physical resource block (Physical RB (PRB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in this specification may be represented in absolute values or in relative values with respect to certain values, or may be represented in another corresponding information. For example, radio resources may be specified by certain indices.

The names used for parameters and so on in this specification are in no respect limiting. For example, since various channels (Physical Uplink Control Channel (PUCCH), Physical Downlink Control Channel (PDCCH), and so on) and information elements can be identified by any suitable names, the various names allocated to these various channels and information elements are in no respect limiting.

The information, signals, and so on described in this specification may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output from higher layers to lower layers, and/or from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in this specification, and other methods may be used as well. For example, reporting of information may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using wired technologies (coaxial cables, optical fiber cables, twisted-pair cables, digital subscriber lines (DSL), and so on) and/or wireless technologies (infrared radiation, microwaves, and so on), these wired technologies and/or wireless technologies are also included in the definition of communication media.

The terms "system" and "network" used in this specification can be used interchangeably.

In the present specification, the terms "base station (BS)," "radio base station," "eNB," "gNB," "cell," "sector," "cell group," "carrier," and "component carrier" may be used interchangeably. A base station may be referred to as a "fixed station," "NodeB," "eNodeB (eNB)," "access point," "transmission point," "receiving point," "femto cell," "small cell" and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of a base station and/or a base station subsystem that provides communication services within this coverage.

In the present specification, the terms "mobile station (MS)," "user terminal," "user equipment (UE)," and "terminal" may be used interchangeably. A base station may be referred to as a "fixed station," "NodeB," "eNodeB (eNB)," "access point," "transmission point," "receiving point," "femto cell," "small cell" and so on.

A mobile station may be referred to, by a person skilled in the art, as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

Furthermore, the radio base stations in this specification may be interpreted as user terminals. For example, each aspect/embodiment of the present invention may be applied to a configuration in which communication between a radio base station and a user terminal is replaced with communication among a plurality of user terminals (Device-to-Device (D2D)). In this case, the user terminals 20 may have the functions of the radio base stations 10 described above. In addition, wording such as "uplink" and "downlink" may be interpreted as "side." For example, an uplink channel may be interpreted as a side channel.

Likewise, the user terminals in this specification may be interpreted as radio base stations. In this case, the radio base stations 10 may have the functions of the user terminals 20 described above.

Actions which have been described in this specification to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GW), and so on may be possible, but these are not limiting) other than base stations, or combinations of these.

The aspects/embodiments illustrated in this specification may be used individually or in combinations, which may be switched depending on the mode of implementation. The order of processes, sequences, flowcharts, and so on that have been used to describe the aspects/embodiments herein may be re-ordered as long as inconsistencies do not arise. For example, although various methods have been illustrated in this specification with various components of steps in exemplary orders, the specific orders that are illustrated herein are by no means limiting.

The aspects/embodiments illustrated in this specification may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-RAT (Radio Access Technology), New Radio (NR), New radio access (NX), Future generation radio access (FX), GSM (registered trademark) (Global System for Mobile communications), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and/or next-generation systems that are enhanced based on these.

The phrase "based on" (or "on the basis of") as used in this specification does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second" and so on as used herein does not generally limit the quantity or order of these elements. These designations may be used herein only for convenience, as a method for distinguishing between two or more elements. Thus, reference to the first and second elements does not imply that only two elements may be employed, or that the first element must precede the second element in some way.

The term "judging (determining)" as used herein may encompass a wide variety of actions. For example, "judging (determining)" may be interpreted to mean making "judgments (determinations)" about calculating, computing, processing, deriving, investigating, looking up, (for example, searching a table, a database, or some other data structures), ascertaining, and so on. Furthermore, "judging (determining)" may be interpreted to mean making "judgments (determinations)" about receiving (for example, receiving information), transmitting (for example, transmitting information), input, output, accessing (for example, accessing data in a memory), and so on. In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

The terms "connected" and "coupled," or any variation of these terms as used herein mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In this specification, when two elements are connected, the two elements may be considered "connected" or "coupled" to each other by using one or more electrical wires, cables and/or printed electrical connections, and, as some non-limiting and non-inclusive examples, by using electromagnetic energy having wavelengths in radio frequency regions, microwave regions and/or (both visible and invisible) optical regions, or the like.

In this specification, the phrase "A and B are different" may mean that "A and B are different from each other." The terms "separate," "be coupled" and so on may be interpreted similarly.

When terms such as "including," "comprising," and variations of these are used in this specification or in claims, these terms are intended to be inclusive, in a manner similar to the way the term "provide" is used. Furthermore, the term "or" as used in this specification or in claims is intended to be not an exclusive disjunction.

Now, although the present invention has been described in detail above, it should be obvious to a person skilled in the art that the present invention is by no means limited to the embodiments described in this specification. The present invention can be implemented with various corrections and in various modifications, without departing from the spirit and scope of the present invention defined by the recitations of claims. Consequently, the description in this specification is provided only for the purpose of explaining examples, and should by no means be construed to limit the present invention in any way.

What is claimed is:

1. A terminal comprising:
a receiver that receives downlink control information; and
a processor that determines, based on an RNTI applied to a cyclic redundancy check (CRC) on the downlink control information and a bit value in a plurality of fields included in the downlink control information, whether to activate or deactivate channel state information reporting.

2. The terminal according to claim 1, wherein the receiver receives the downlink control information by using a UE-specific search space.

3. The terminal according to claim 2, wherein the processor determines, based on a bit value in at least a resource assignment field included in the downlink control information, to deactivate the channel state information reporting.

4. The terminal according to claim 1, wherein the processor determines, based on a bit value in at least a resource assignment field included in the downlink control information, to deactivate the channel state information reporting.

5. A radio communication method for a terminal, comprising:
receiving downlink control information; and
determining, based on an RNTI applied to a cyclic redundancy check (CRC) on the downlink control information and a bit value in a plurality of fields included in the downlink control information, whether to activate or deactivate channel state information reporting.

6. A base station comprising:
a transmitter that transmits downlink control information; and
a processor that controls to determine, based on an RNTI applied to a cyclic redundancy check (CRC) on the downlink control information and a bit value in a plurality of fields included in the downlink control information, whether to activate or deactivate channel state information reporting.

7. A system comprising a base station and a terminal, wherein:
the base station comprises:
a transmitter that transmits downlink control information; and
a processor of the base station that controls to determine, based on an RNTI applied to a cyclic redundancy check (CRC) on the downlink control information and a bit value in a plurality of fields included in the downlink control information, whether to activate or deactivate channel state information reporting, and
the terminal comprises:
a receiver that receives the downlink control information; and
a processor of the terminal that determines, based on the RNTI applied to the CRC on the downlink control information and the bit value in the plurality of fields included in the downlink control information, whether to activate or deactivate channel state information reporting.

* * * * *